(12) United States Patent
Hong

(10) Patent No.: US 11,152,824 B2
(45) Date of Patent: Oct. 19, 2021

(54) POWER TERMINAL AND MOTOR INCLUDING SAME

(71) Applicant: LG INNOTEK CO., LTD., Seoul (KR)

(72) Inventor: Hoon Ki Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 219 days.

(21) Appl. No.: 16/096,567

(22) PCT Filed: Apr. 20, 2017

(86) PCT No.: PCT/KR2017/004221
§ 371 (c)(1),
(2) Date: Oct. 25, 2018

(87) PCT Pub. No.: WO2017/188659
PCT Pub. Date: Nov. 2, 2017

(65) Prior Publication Data
US 2019/0140496 A1    May 9, 2019

(30) Foreign Application Priority Data

Apr. 27, 2016    (KR) .................. 10-2016-0051508

(51) Int. Cl.
| | |
|---|---|
| *H02K 3/50* | (2006.01) |
| *H02K 1/24* | (2006.01) |
| *H02K 3/34* | (2006.01) |
| *H02K 5/22* | (2006.01) |
| *H02K 3/52* | (2006.01) |

(52) U.S. Cl.
CPC .................. *H02K 1/24* (2013.01); *H02K 3/34* (2013.01); *H02K 3/50* (2013.01); *H02K 3/522* (2013.01); *H02K 5/22* (2013.01); *H02K 2201/06* (2013.01)

(58) Field of Classification Search
CPC ............................ H02K 3/50; H02K 2203/09
See application file for complete search history.

(56) References Cited

U.S. PATENT DOCUMENTS

| | | |
|---|---|---|
| 2004/0124733 A1 | 7/2004 | Yamamoto et al. |
| 2004/0251766 A1 | 12/2004 | Kometani et al. |
| 2007/0273221 A1 | 11/2007 | Kinoshita et al. |

(Continued)

FOREIGN PATENT DOCUMENTS

| | | |
|---|---|---|
| JP | 61-92134 A | 5/1988 |
| JP | 2-123934 A | 5/1990 |

(Continued)

*Primary Examiner* — Ramon M Barrera
(74) *Attorney, Agent, or Firm* — Birch, Stewart, Kolasch & Birch, LLP

(57) ABSTRACT

An embodiment relates to a power terminal and a motor including the same, the power terminal comprising: a body; a pin portion extending upward from the body; a coupling portion formed at one end of the body and coupled to an end of a coil; a first protrusion protruding downward from the body; and a second protrusion protruding downward from the body, wherein the second protrusion is arranged to be spaced inward or outward form the body. As a result, the power terminal can improve the productivity through process simplification while satisfying a true position geometric tolerance.

17 Claims, 17 Drawing Sheets

(56) References Cited

U.S. PATENT DOCUMENTS

| | | | |
|---|---|---|---|
| 2014/0028127 A1* | 1/2014 | Chamberlin | H02K 5/225 310/71 |
| 2016/0013691 A1 | 1/2016 | Houzumi et al. | |
| 2016/0036187 A1 | 2/2016 | Houzumi et al. | |
| 2016/0218578 A1* | 7/2016 | Yamada | H02K 15/0068 |

FOREIGN PATENT DOCUMENTS

| | | |
|---|---|---|
| JP | 5-95194 U | 12/1993 |
| JP | 2004-208386 A | 7/2004 |
| JP | 2007-318885 A | 12/2007 |
| JP | 2012-196018 A | 10/2012 |
| JP | 2013-42633 A | 2/2013 |
| JP | 2013-162648 A | 8/2013 |
| JP | 2014-176207 A | 9/2014 |
| JP | 2016-19421 A | 2/2016 |
| KR | 10-2012-0001891 A | 1/2012 |
| WO | WO 2014/018626 A1 | 1/2014 |

* cited by examiner

[Figure 1]
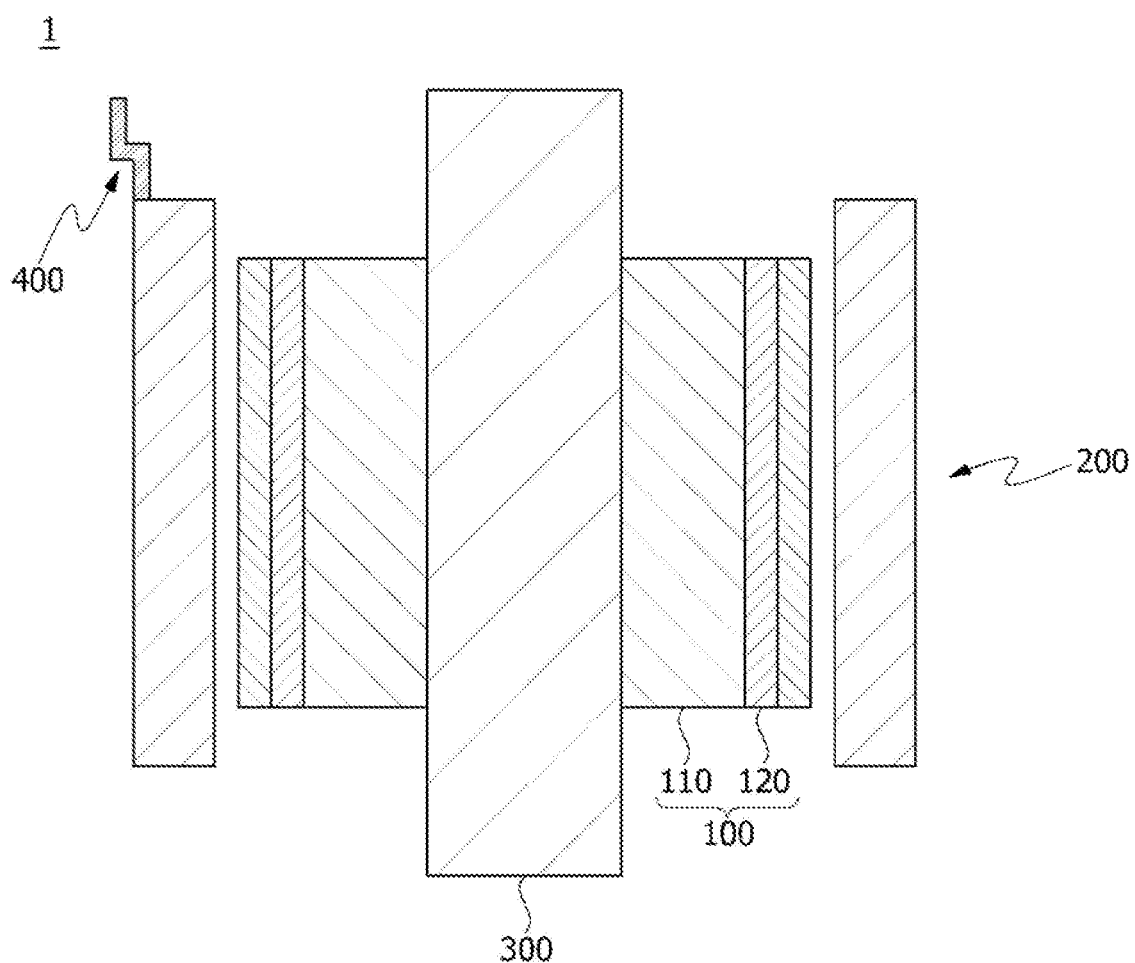

[Figure 2]
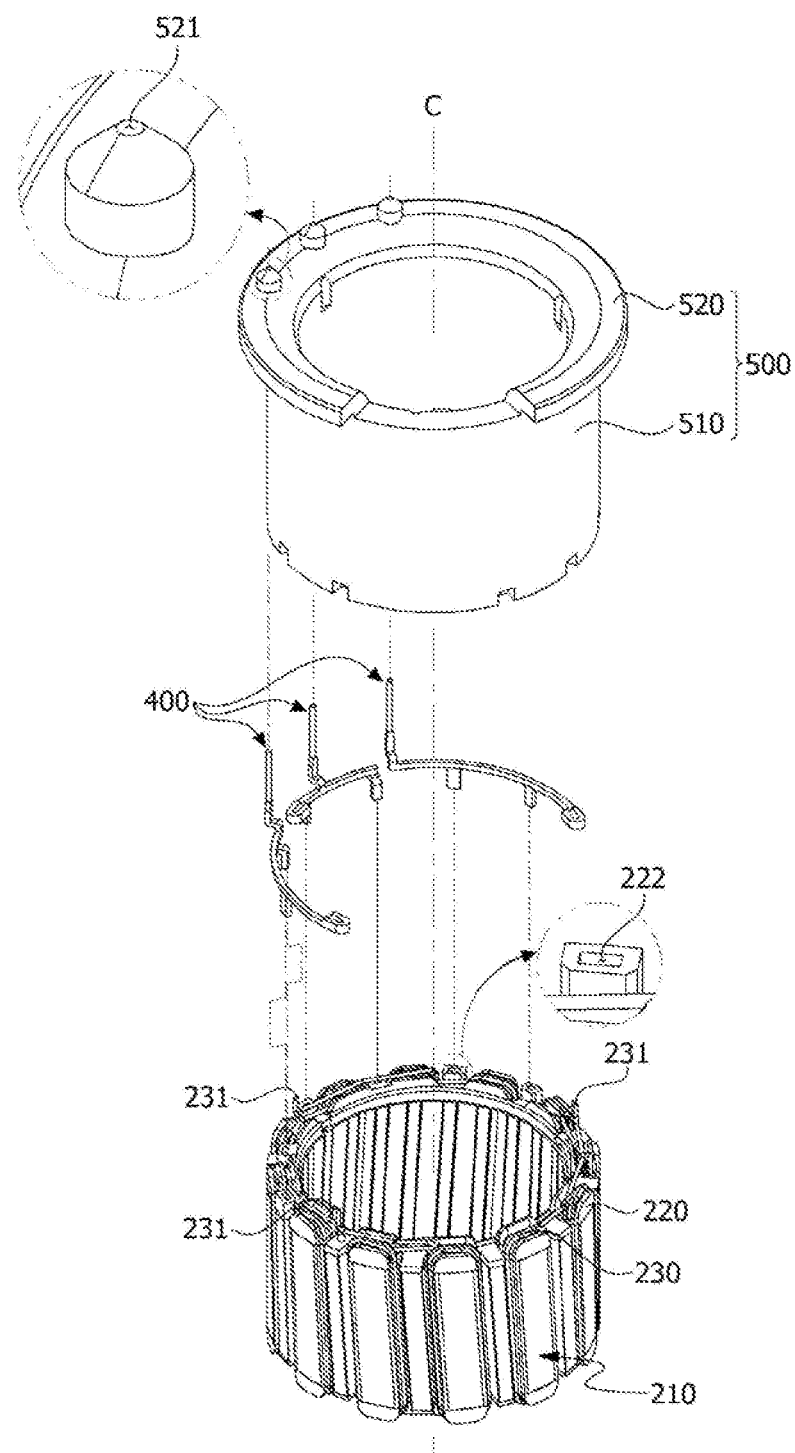

[Figure 3]
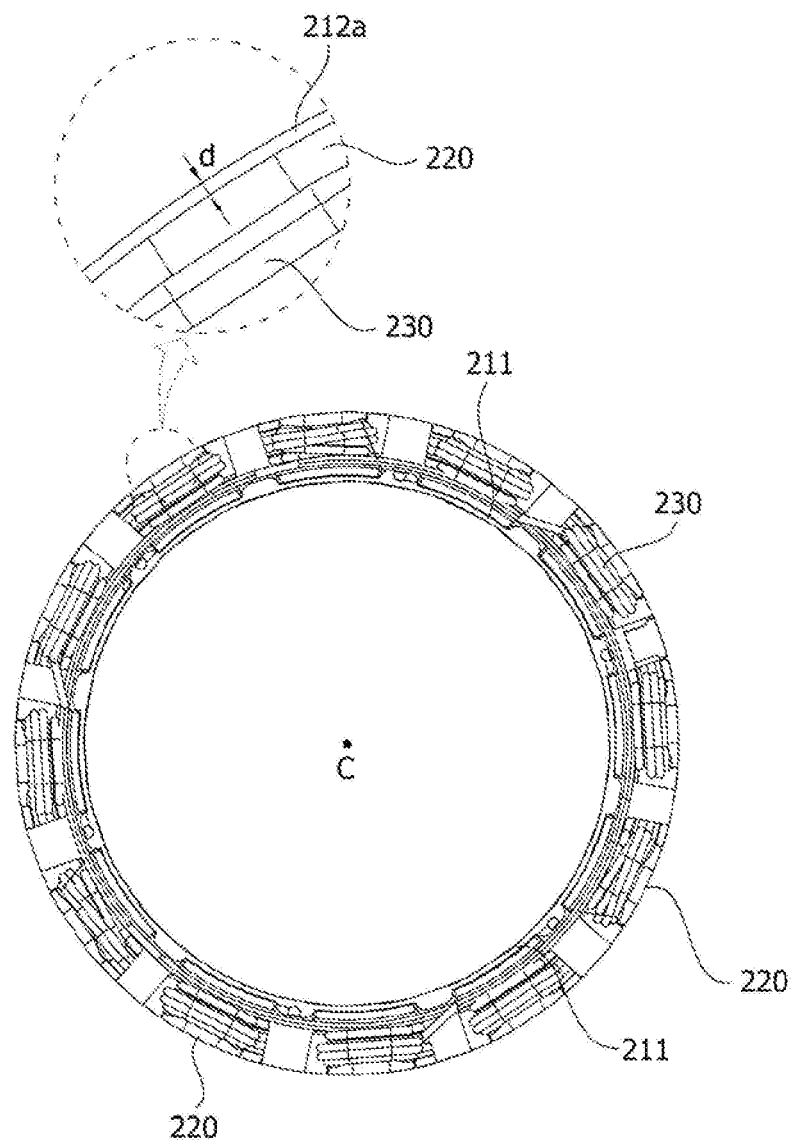

【Figure 4】
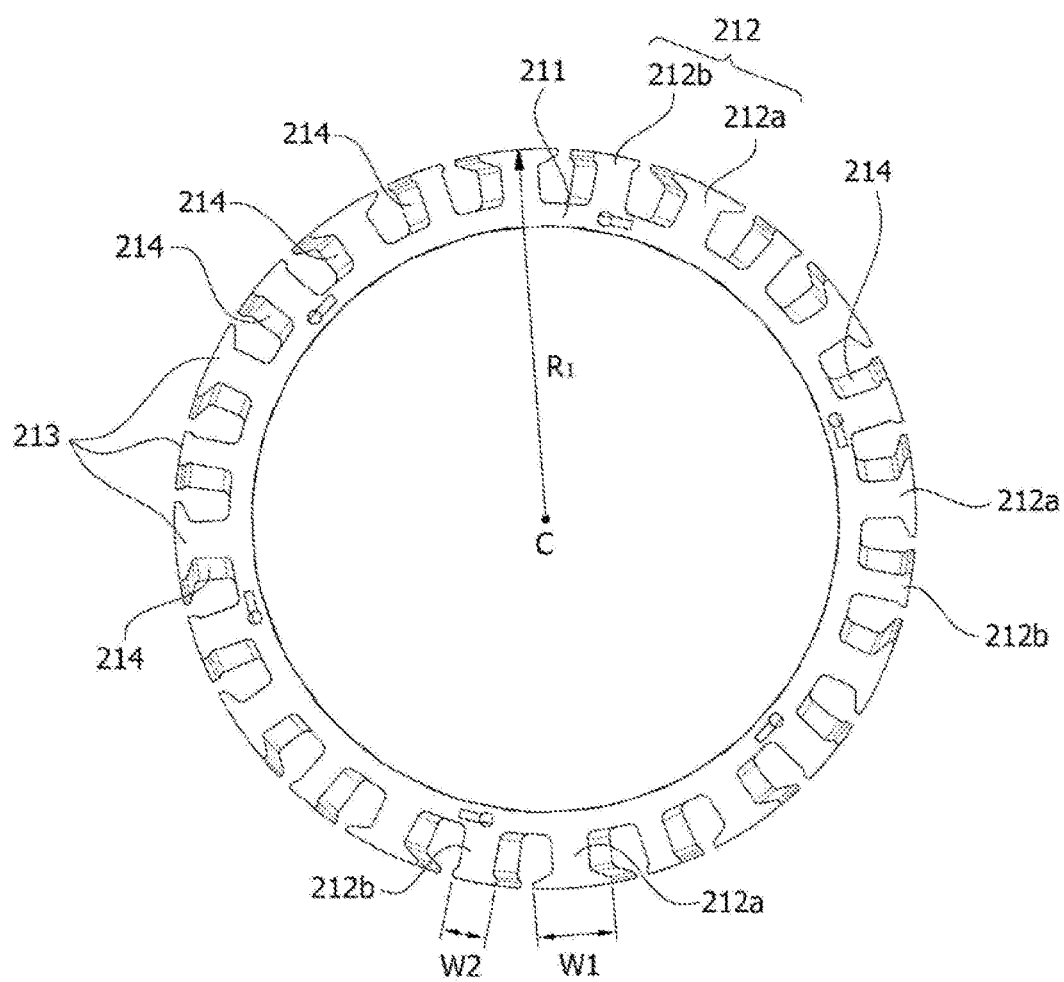

【Figure 5】
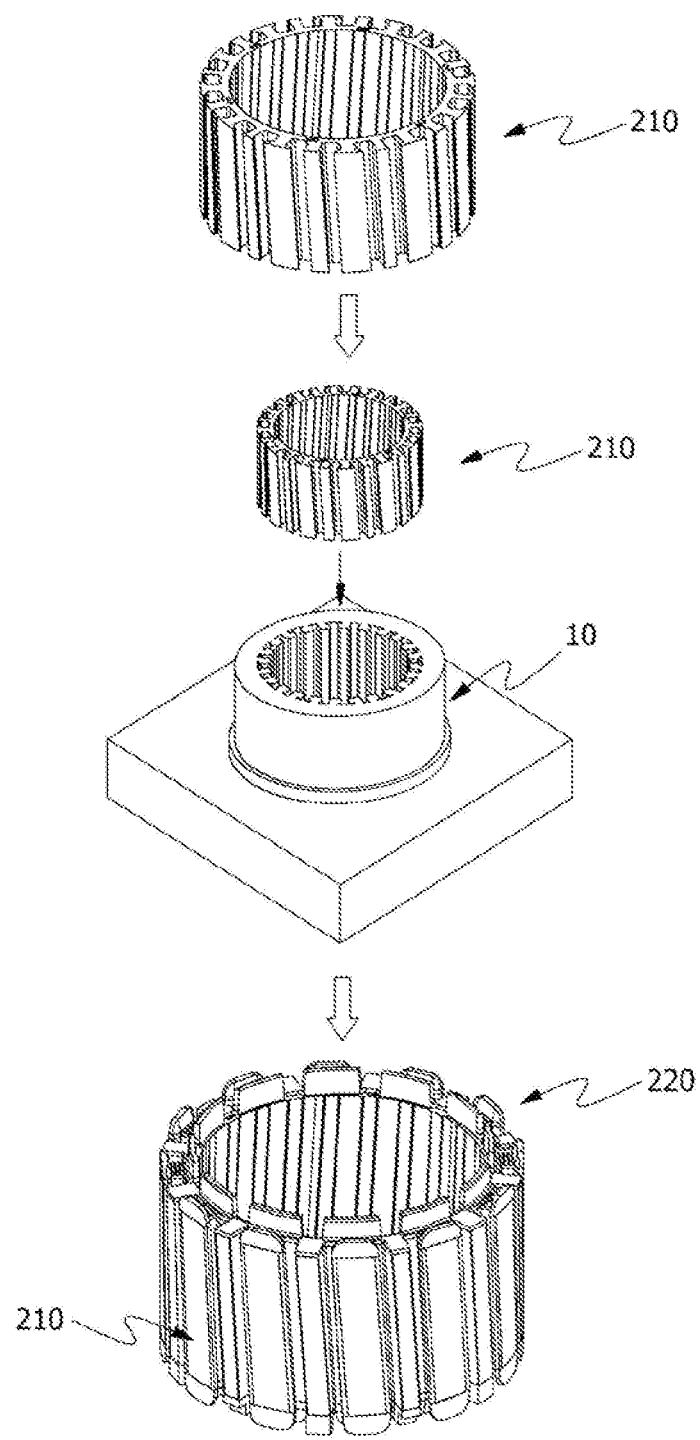

【Figure 6】
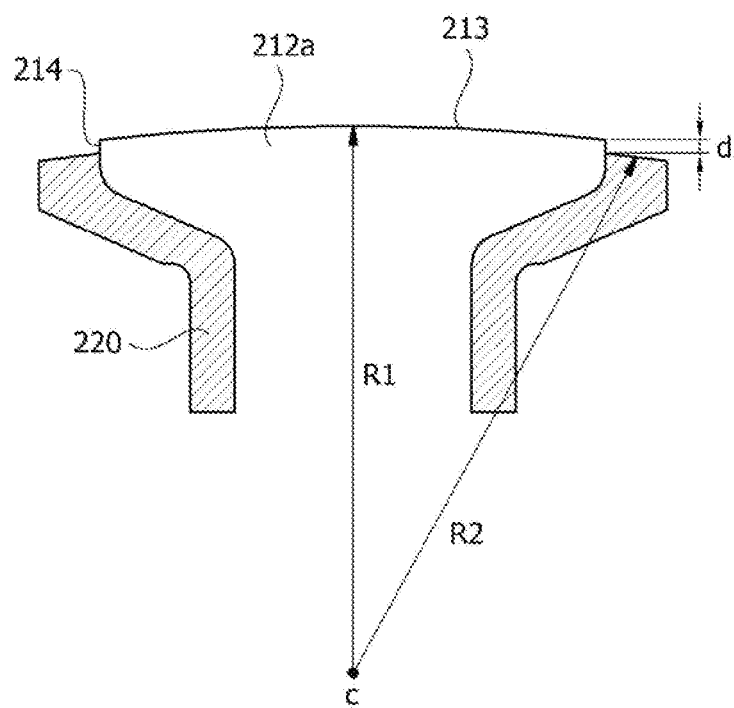
【Figure 7】
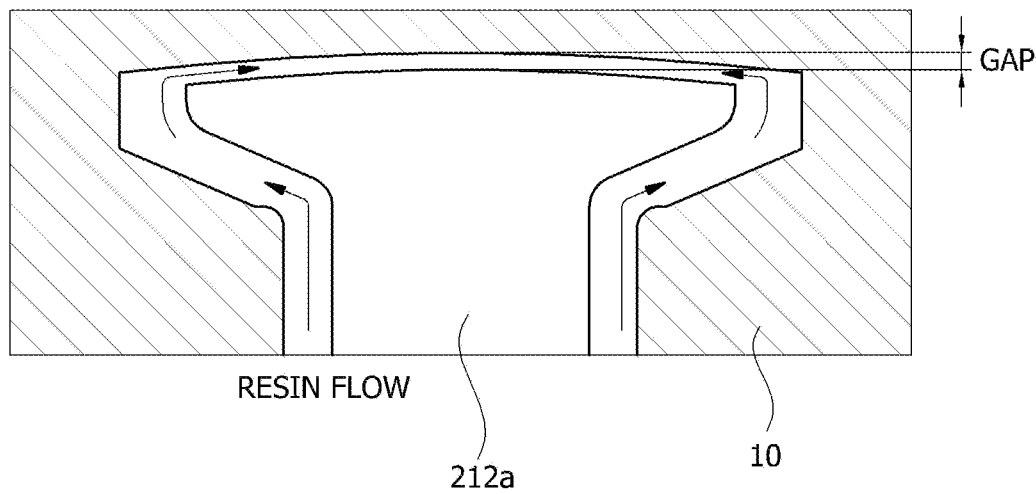

[Figure 8]
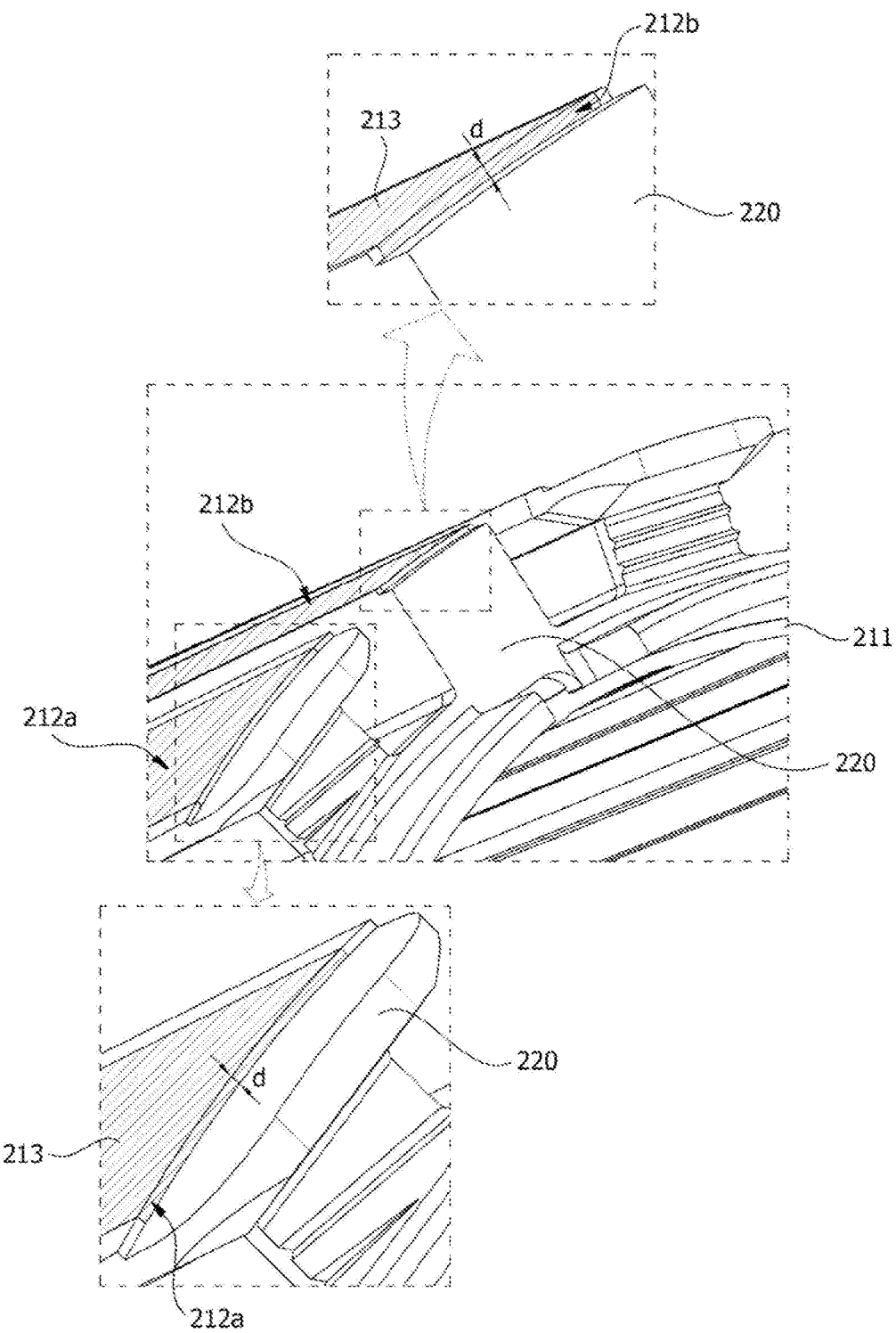

[Figure 9]
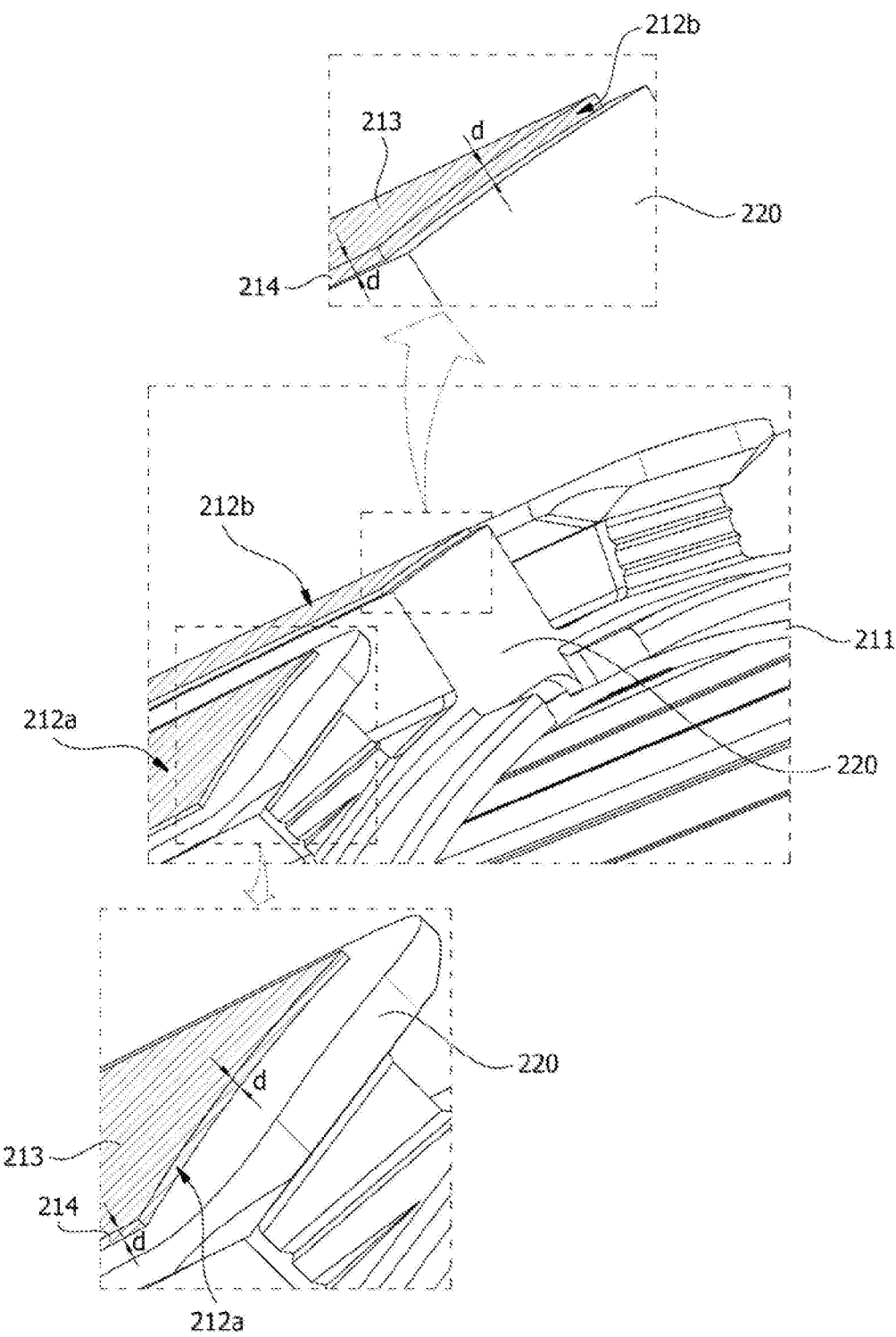

【Figure 10】
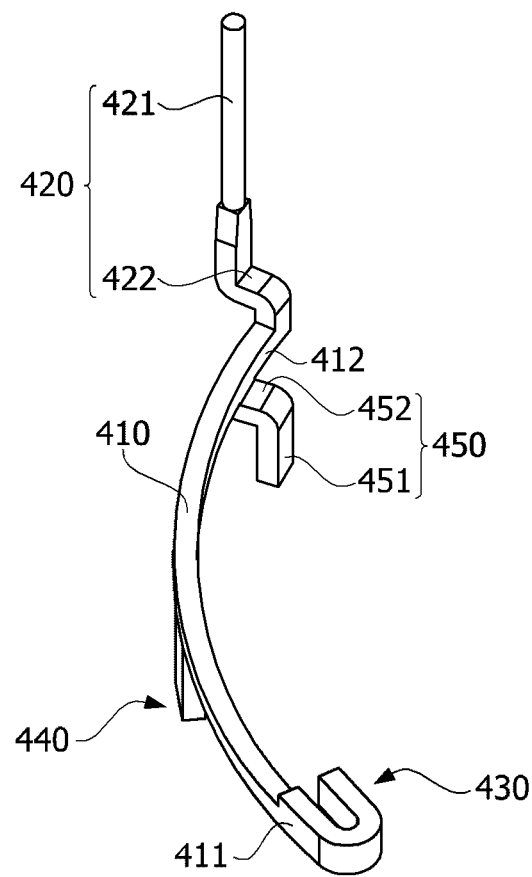

【Figure 11】
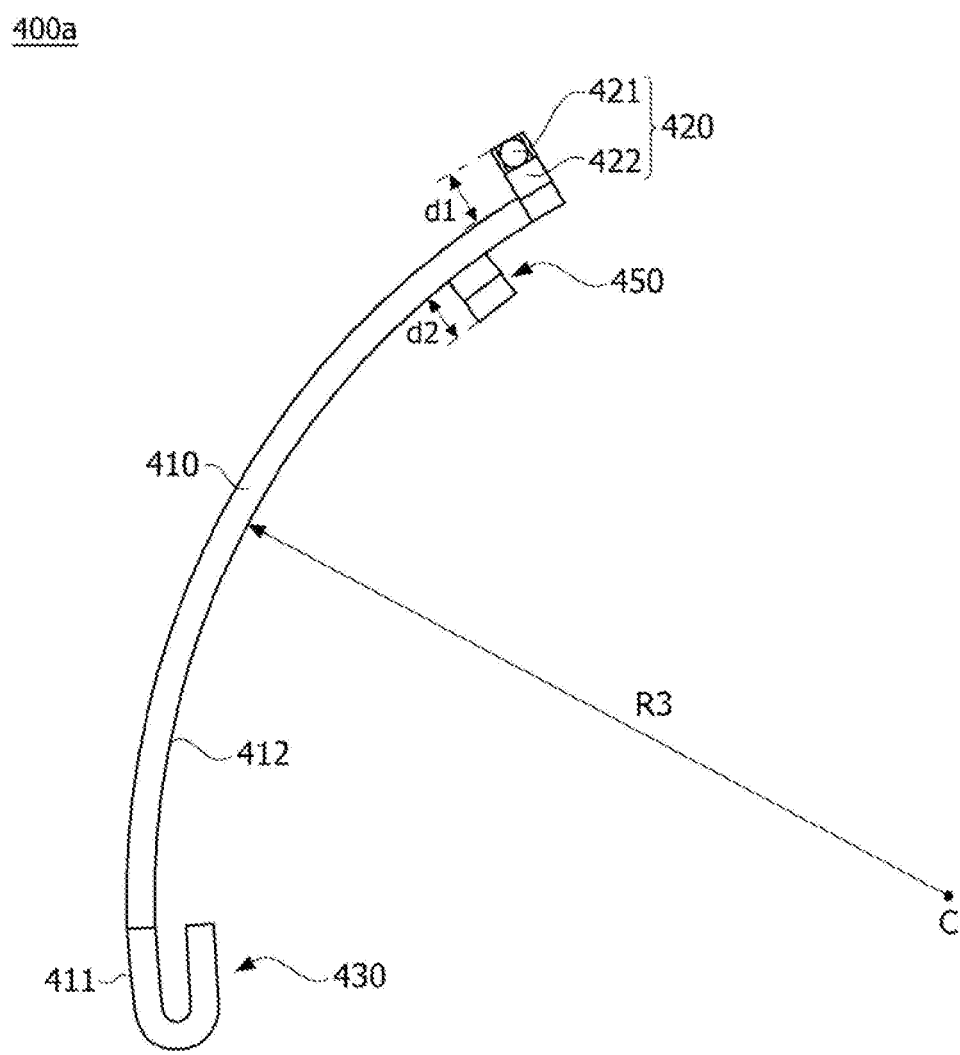

【Figure 12】
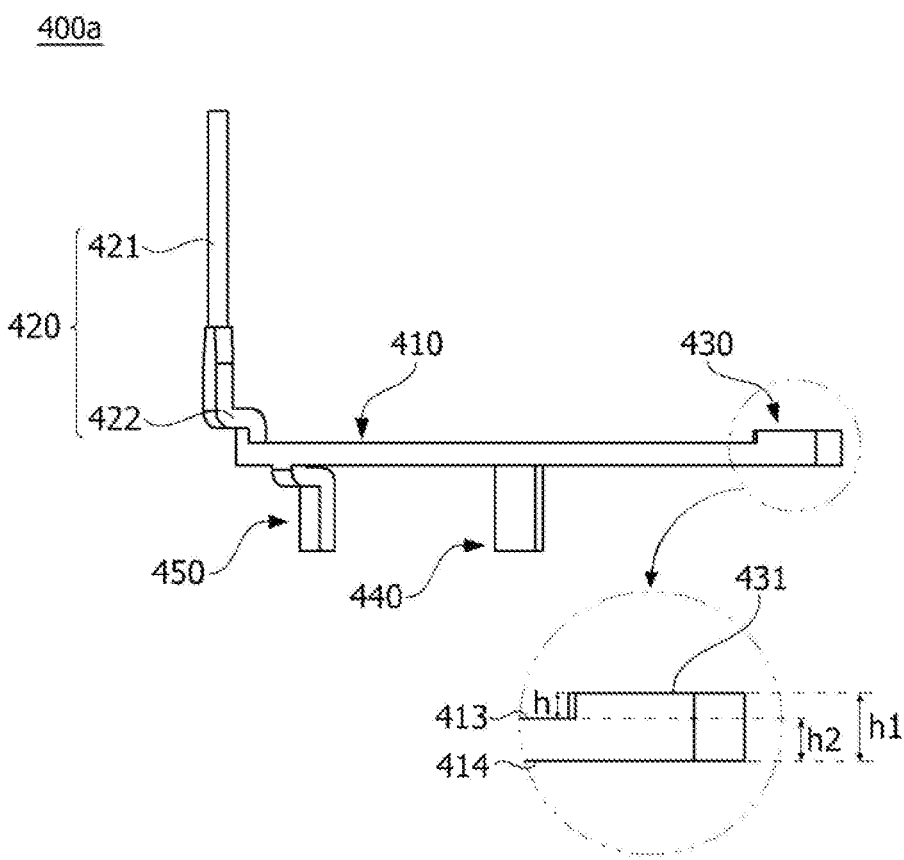

[Figure 13]
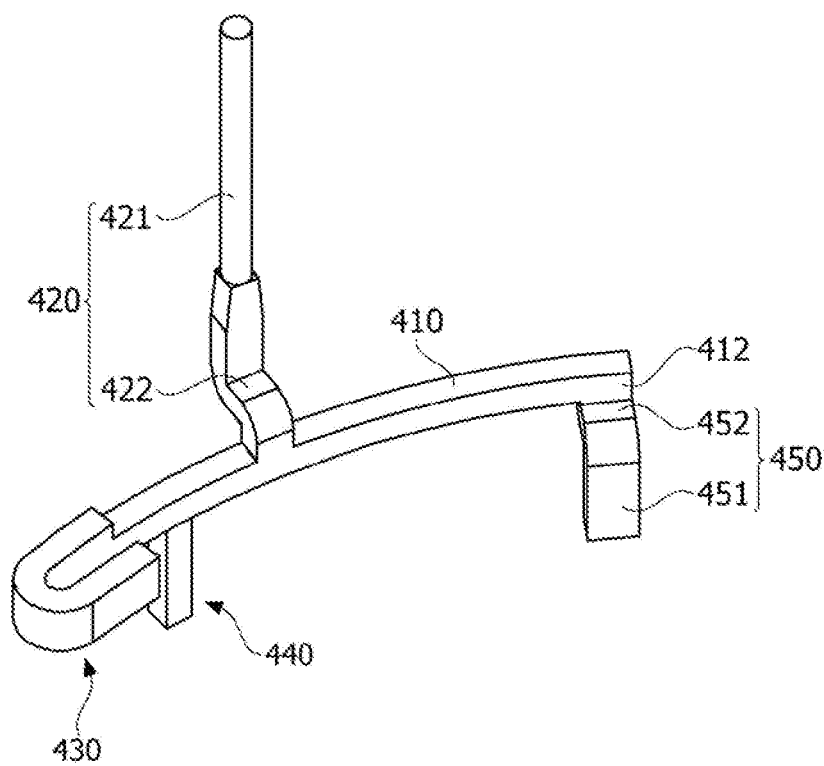

【Figure 14】
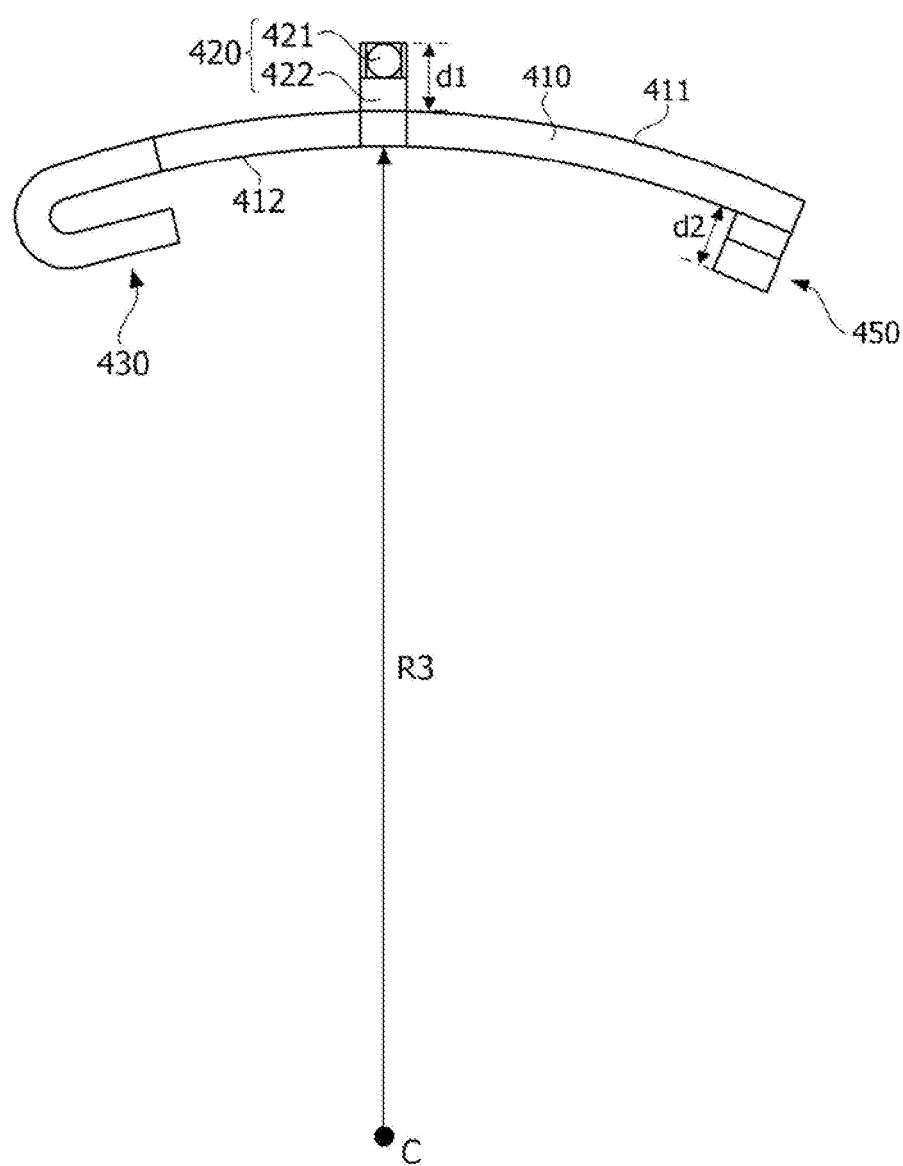

【Figure 15】
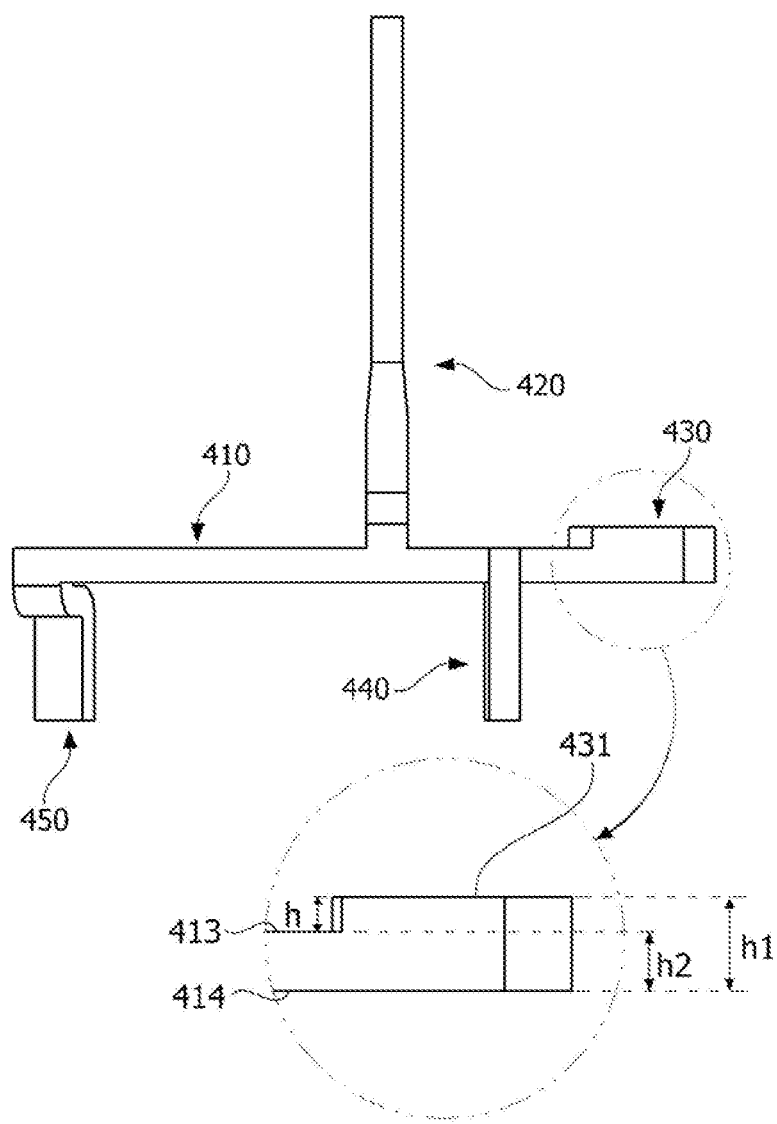

【Figure 16】
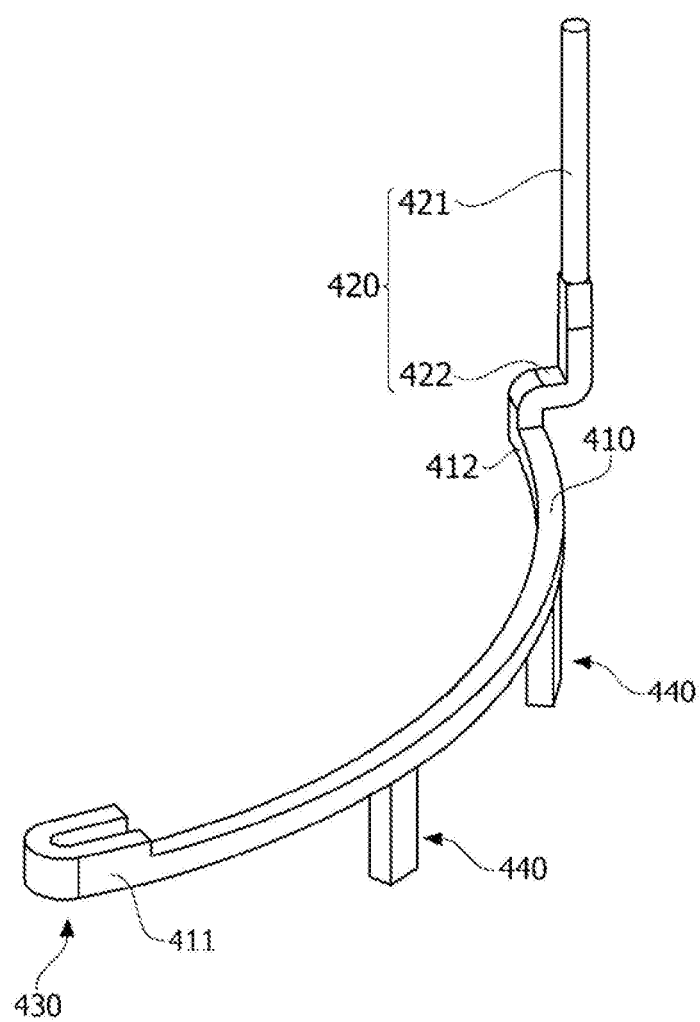

[Figure 17]
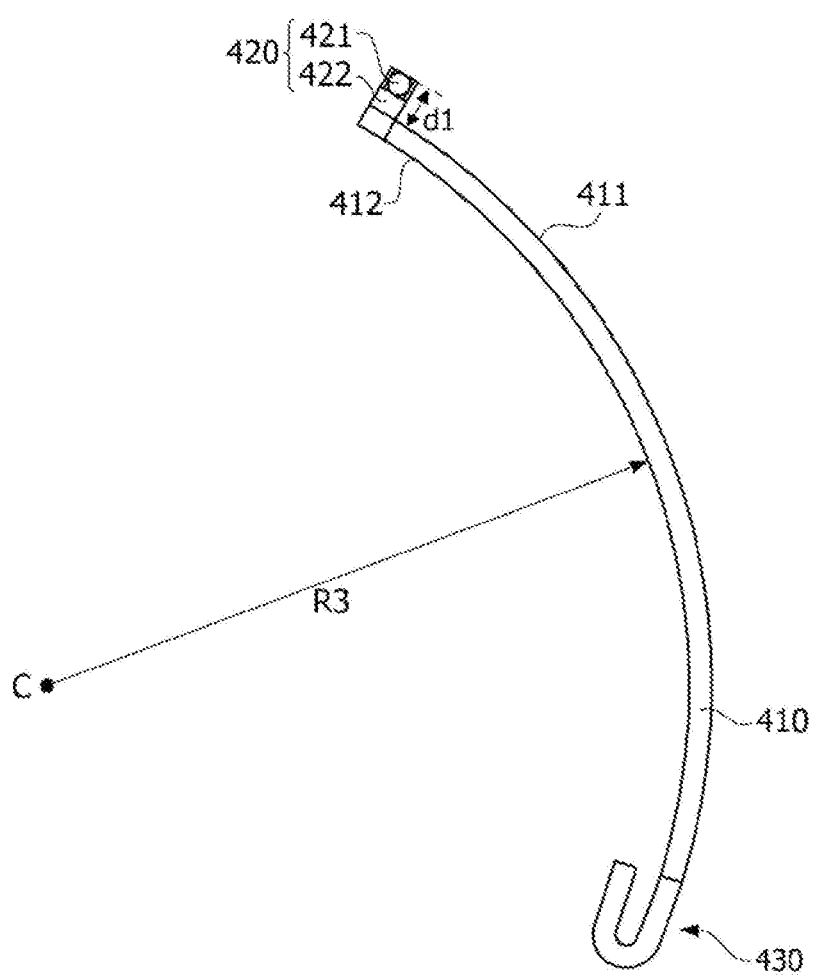

[Figure 18]
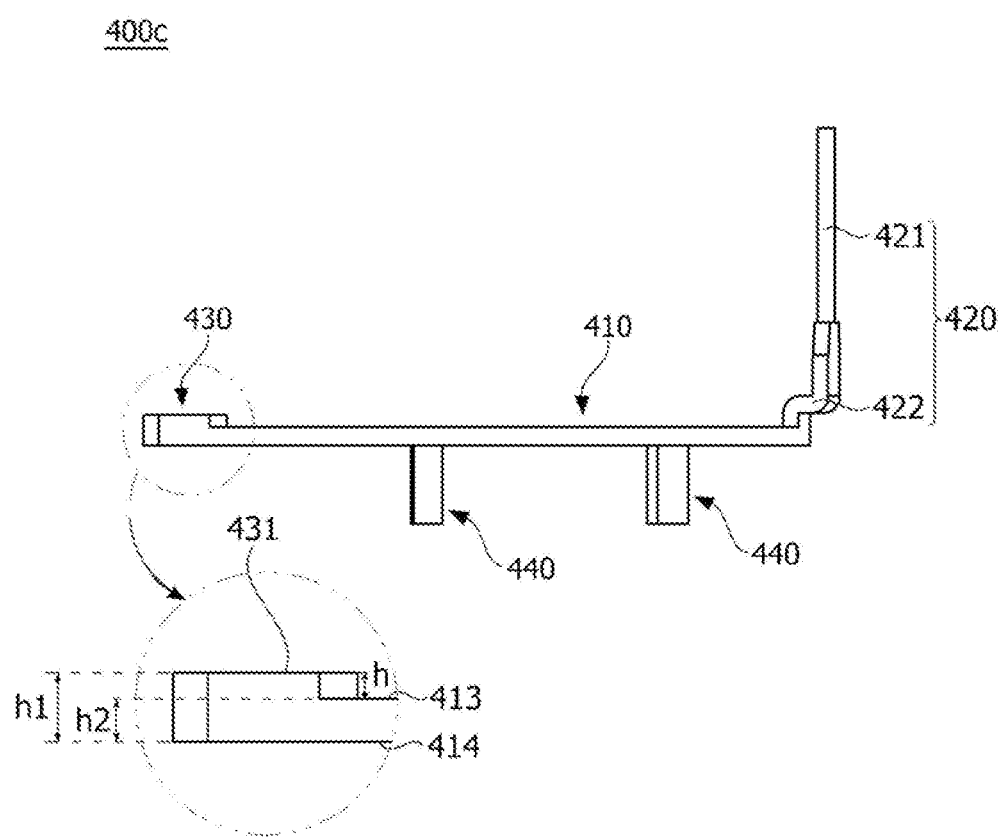

POWER TERMINAL AND MOTOR INCLUDING SAME

CROSS REFERENCE TO RELATED APPLICATIONS

This application is the National Phase of PCT International Application No. PCT/KR2017/004221, filed on Apr. 20, 2017, which claims priority under 35 U.S.C. 119(a) to patent application Ser. No. 10-2016-0051508, filed in the Republic of Korea on Apr. 27, 2016, all of which are hereby expressly incorporated by reference into the present application.

TECHNICAL FIELD

Embodiments relate to a power terminal and a motor including the same.

BACKGROUND ART

A motor generates rotating power through interaction with an electromagnetic force generated by a rotor including a plurality of magnets and a coil wound around a stator.

Accordingly, the motor can include a shaft which is rotatably formed, a rotor coupled to the shaft, and a stator fixed to the inside of a housing. Here, the stator is installed with a gap along a circumference of the rotor. Further, a coil forming a rotating magnetic field is wound around the stator.

Correspondingly, the coil causes electric interaction with the rotor to induce rotation of the rotor. Accordingly, when the rotor rotates, the shaft rotates.

Further, the stator used in the motor may include a stator core, an insulator, and the coil. Here, the stator core may include a cylindrical-shaped main body made of a metal material, and a plurality of teeth may be formed to protrude from an outer circumferential surface of the main body.

Further, the coil can be wound around the tooth. In this case, an insulator may be disposed between the tooth and the coil.

Since the motor has recently been miniaturized and thus it is necessary for the stator core to be miniaturized and lightened, a case of forming a stator core by stacking thin metal plates at a predetermined thickness or a case of forming a cylindrical-shaped stator core by assembling T-shaped divided cores each having one tooth rather than a case of using the conventional stator core formed from one body is more common.

Further, a power terminal coupled to an end of the coil which is disposed to protrude may be disposed on the stator. In addition, the power terminal may have a pin disposed therein to be electrically connected to a power source.

In this case, since the power terminal and the pin are implemented in a separated structure, the power terminal and the pin may be separately manufactured and coupled to each other by a fusing method.

However, since a hook-shaped coupling portion has to be formed on the power terminal and the pin has to be fused with the coupling portion to couple the pin to the power terminal, a process thereof is complicated. Further, since the number of components such as the pin and the like increases, assembly processes are concentrated and thus costs increase.

For example, since a plurality of processes including assembling the power terminal to the stator, assembling the pin to the power terminal and then pressing the pin, fusing the pin, and fusing a wire, the number of processes increases and thus production costs increase and productivity is degraded.

Further, since the power terminal and the pin are separated structures, true position geometric tolerance required when the power terminal and the pin are coupled is difficult to satisfy.

DISCLOSURE

Technical Problem

The present invention is directed to providing a power terminal with which a pin is integrally formed so that true position geometric tolerance is satisfied and productivity is improved through process simplification and a motor including the same.

Further, the present invention is directed to providing a power terminal capable of preventing generation of a vibration and noise according to rotation of a motor and securing structural stability when coupled to an insulator and a motor including the same.

Problems desired to be solved by the present invention are not limited to the above-described problems, and other problems not mentioned above may be apparently understood by those skilled in the art from below.

Technical Solution

An embodiment of the present invention provides a power terminal including a body; a pin portion configured to extend upward from the body; a coupling portion formed at one side of the body and coupled to a coil; a first protrusion configured to protrude downward from the body; and a second protrusion configured to protrude downward from the body, wherein the second protrusion is disposed to be spaced apart toward the inside or the outside from the body.

The body, the pin portion, the coupling portion, the first protrusion, and the second protrusion may be integrally formed.

The body may be formed in a curved shape to have a predetermined curvature radius (R3).

The pin portion is disposed to be spaced apart toward the outside from the body.

The second protrusion may be disposed opposite the pin portion with respect to the body.

The pin portion may include a power connection part disposed to be spaced apart from the body and a first connection part disposed between the body and the power connection part.

An end of the power connection part may be formed in a cylindrical shape.

Meanwhile, a height (h1) of the coupling portion may be disposed to be greater than a height (h2) of the body with respect to a lower surface of the body.

Another embodiment of the present invention provides a motor including a rotor; a stator disposed at the outside of the rotor; a shaft disposed at the inside of the rotor; and a terminal disposed on the stator, wherein the terminal includes a body; a pin portion configured to extend upward from the body; a coupling portion formed at one side of the body and coupled to a coil; a first protrusion configured to protrude downward from the body; and a second protrusion configured to protrude downward from the body, wherein the second protrusion is disposed to be spaced apart toward the inside or the outside from the body.

The first protrusion and the second protrusion may be coupled to an insertion port formed in an upper part of an insulator of the stator. In this case, the pin portion may be disposed to be spaced apart toward the outside from the body, and the second protrusion may be disposed opposite the pin portion with respect to the body. That is, the second protrusion may be disposed to be spaced apart toward the inside from the body.

The stator may include a skew-type stator core having a cylindrical-shaped main body and including a plurality of teeth formed along a circumferential direction of the main body to protrude in a radial direction; an insulator disposed in the stator core; and a coil wound around the insulator, wherein the first protrusion and the second protrusion may be insertion-coupled to the insertion port formed in the insulator.

The motor may further include a housing including a cylindrical-shaped housing main body disposed at the outside of the stator and a flange formed to protrude outward from an end of the housing main body, wherein the pin portion may pass through and be coupled to a through hole formed in the flange.

Advantageous Effects

In a power terminal according to the above-described embodiment, a body, a pin portion, a first protrusion, and a second protrusion can be integrally formed to satisfy true position geometric tolerance and improve productivity through process simplification.

Further, a three-dimensional three point support structure by a first protrusion, a second protrusion, and the pin portion formed to protrude from the body of the power terminal can be implemented to prevent generation of a vibration and noise according to rotation of a motor and secure structural stability.

DESCRIPTION OF DRAWINGS

FIG. 1 is a view illustrating a motor according to an embodiment.

FIG. 2 is an exploded perspective illustrating coupling of a stator and a power terminal according to the embodiment.

FIG. 3 is a plan view illustrating the stator according to the embodiment.

FIG. 4 is a view illustrating a stator core of the stator according to the embodiment.

FIG. 5 is a view illustrating a process of manufacturing an insulator of the stator according to the embodiment in an insert injection-molding method.

FIG. 6 is a view illustrating a gap formed between an external diameter of the insulator of the stator according to the embodiment and an external diameter of a tooth.

FIG. 7 is a view in which a resin is injected to form the insulator of the stator according to the embodiment.

FIG. 8 is a view illustrating a gap formed in an upper portion of the tooth forming the stator according to the embodiment.

FIG. 9 is a view illustrating a gap formed in the upper portion and a side surface of the tooth forming the stator according to the embodiment.

FIGS. 10 to 12 are each a perspective view, a plan view, and a side view illustrating the power terminal according to the embodiment.

FIGS. 13 to 15 are each a perspective view, a plan view, and a side view illustrating a power terminal according to another embodiment.

FIGS. 16 to 18 are each a perspective view, a plan view, and a side view illustrating a power terminal according to still another embodiment.

MODES OF THE INVENTION

Since the present invention may be variously changed and have various embodiments, particular embodiments will be exemplified in the drawings and described. However, the present invention is not limited to the particular embodiment, and includes all changes, equivalents, and substitutes falling within the spirit and the scope of the present invention.

Further, it should be understood that, although the terms "first," "second," and the like may be used herein to describe various elements, the elements are not limited by the terms. The terms are only used to distinguish one element from another. For example, a first element could be termed a second element, and similarly, a second element could be termed a first element without departing from the scope of the present invention. The term "and/or" includes combinations of one or all of a plurality of associated listed items.

When predetermined components are mentioned to be "linked," "coupled," or "connected" to other components, the components may be directly linked or connected to other components, but it should be understood that additional components may be "linked," "coupled," or "connected" therebetween. However, when the predetermined components are mentioned to be "linked," "coupled," or "connected" to other components, it should be understood that no additional components exist between the above-described components.

In the description of the embodiments, a term "on" or "under" in a case in which one predetermined component is disclosed to be formed "on" or "under" the other component includes both a case in which the two components are directly in contact with each other and a case in which at least one other component is formed to be disposed between the two components. Further, the term "on" or "under" may also include terms "upward direction" and "downward direction" with respect to one component.

Terms used in the present invention are just used to describe the particular embodiments, and not to limit the present invention. The singular form is intended to also include the plural form, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Unless otherwise defined, all terms including technical or scientific terms used in the present invention have meanings the same as those of terms generally understood by those skilled in the art. Generally used terms defined in a dictionary should be interpreted to have meanings the same as meanings in the context of the related art and are not interpreted as ideal or excessively formal meanings unless the present invention clearly defines otherwise.

Hereinafter, the embodiments will be described in detail with reference to the accompanying drawings, the same reference numerals are applied to the same or corresponding components regardless of the drawing numerals, and overlapping descriptions will be omitted.

FIG. 1 is a view illustrating a motor according to an embodiment, and FIG. 2 is an exploded perspective illustrating coupling of a stator and a power terminal according to the embodiment.

Referring to FIGS. 1 and 2, a motor 1 according to the embodiment may include a rotor 100, a stator 200, a shaft 300, and a plurality of terminals 400. Further, the motor 1 may also include a housing 500 to fix the terminal 400 installed on the stator 200. Here, since the terminal 400 may be provided as a power terminal configured to apply power to a coil, and hereinafter, the terminal 400 may be described as power terminal 400.

The rotor 100 may be disposed inside the stator 200.

The rotor 100 may be configured by coupling of a magnet 120 to a rotor core 110.

For example, the rotor 100 may be configured by inserting the magnet into a pocket provided in the rotor core 110. A sensing magnet configured to gain location information of the rotor 100 may be coupled to a plate and installed on the rotor 100, or a rotor location sensing means may be installed on the rotor 100. Further, both ends of the shaft 300 may be rotatably supported by a bearing.

The stator 200 is coupled to the housing 500, and the rotor 100 is disposed at the inside of the stator 200. The shaft 300 may be coupled to a center portion of the rotor 100. The coil is wound around the stator 200, and thus the stator 200 has a magnetic pole. The rotor 100 rotates due to a magnetic field formed by winding of the coil, and the shaft 300 rotates at the same time.

Referring to FIGS. 2 to 5, the stator 200 may include a stator core 210, an insulator 220 disposed in the stator core 210, and a coil 230 wound around the insulator 220.

The stator core 210 may include a main body 211 having a cylindrical shape and a plurality of teeth 212 formed to protrude in a radial direction along a circumferential direction of the main body 211 with respect to a virtual line which passes through a center C of the main body 211.

Here, as shown in FIG. 4, the tooth 212 may include a first tooth 212a of which a cross-section has a T shape and a second tooth 212b of which a cross-section has an l shape.

Further, each of the first tooth 212a and the second tooth 212b may be disposed in the main body 211 to have a predetermined outer radius R1 with respect to a center C of the stator core 210.

Meanwhile, a width W1 of the first tooth 212a may be formed to be greater than a width W2 of the second tooth 212b. That is, since widths of the first tooth 212a and the second tooth 212b are different, a winding amount of the coil 230 wound around the first tooth 212a and a spaced distance between the first teeth 212a may be adjusted. Accordingly, a change of the magnetic field may be induced.

Here, the second tooth 212b may prevent contact between the coils 230 which are each wound around each of the first teeth 212a. For example, since the coil 230 may be wound around only the first tooth 212a, the second tooth 212b may prevent the contact between the coils 230 e which are ach wound around each of the first teeth 212a.

Further, the stator core 210 may be formed by stacking thin plate-shaped stator plates so that the plurality of teeth 212 may be formed to protrude in the radial direction.

For example, after each of a plurality of silicon steel plates having a thickness of 0.35 to 0.5 mm is formed in a predetermined shape to form the stator plates, the stator plates may be stacked to form the stator core 210.

In this case, since each of the stator plates may be disposed to be twisted at a predetermined angle with respect to the radial direction, the stator core 210 may be manufactured as a skew-type.

That is, the tooth 212 may be provided as the first tooth 212a having a T shape twisted at a predetermined angle and the second tooth 212b having an l shape twisted at the predetermined angle. In a description of the tooth 212 of the embodiment, although an example in which the first tooth 212a and the second tooth 212b are manufactured as the skew is described, the present invention is not limited thereto, and only one of the first tooth 212a and the second tooth 212b may be formed as the skew-type or only one of the first tooth 212a and the second tooth 212b may be disposed in the main body 211 as the skew-type.

Correspondingly, cogging torque of the stator core 210 formed in the skew-type may be minimized, and accordingly, noises and vibrations may be greatly reduced.

The insulator 220 may be located at one area of the stator core 210 using an insert injection-molding method.

For example, referring to FIG. 2, the insulator 220 may be formed on an upper part, a lower part, and a side surface of the tooth 212. Accordingly, the tooth 212 may be insulated from the coil 230 by the insulator 220.

Referring to FIG. 5, the stator core 210 in which the plurality of teeth 212 are formed may be disposed in the mold 10, and the insulator 220 may be formed through the insert injection-molding method. Here, the insulator 220 may be made of one material among resin, synthetic resins, rubber, and urethane and may also be injection-molded with a plurality of terminal members.

Here, since the stator core 210 is formed as the skew-type, the stator core 210 may be disposed in the mold 10 while rotating at a predetermined angle.

Meanwhile, an outer radius R2 of the insulator 220 formed through the insert injection-molding method may be formed to be smaller than the outer radius R1 of the tooth 212. Accordingly, a gap d may be formed between the tooth 212 and the insulator 220.

Here, the outer radius R1 of the tooth 212 may refer to a distance from the center C to an outer circumferential surface 213 of the tooth 212, and the outer radius R2 of the insulator 220 may refer to a distance from the center C to an outer circumferential surface 221 of the insulator 220.

Hereinafter, in a description of the gap d formed between the tooth 212 and the insulator 220, the gap d may be formed on each of the first tooth 212a and the second tooth 212b, and the gap d formed on the first tooth 212a is described with reference to FIGS. 6 to 9.

As shown in FIG. 6, the insulator 220 may be formed by inserting resin or the like thereinto so that the gap d may be formed between the first tooth 212a and the insulator 220.

As shown in FIG. 7, when the resin or the like is inserted so that the outer radius R1 of the tooth 212 and the outer radius R2 of the insulator 220 are the same, since the resin or the like flows to the outer circumferential surface of the tooth 212 due to a gap between the mold 10 and the outer radius R1 of the tooth 212 and thus an unnecessary injection-molding product may be formed, in the embodiment, the resin or the like may be inserted to form the gap d.

The gap d may be formed on the upper part and the lower part of the tooth 212. As shown in FIG. 8, the gap d may be formed on an upper surface and a lower surface of the tooth 212. Accordingly, a structure of the mold 10 may be simplified, and generation of the unnecessary injection-molding product may be minimized. However, the outer radius R2 of the insulator 220 disposed on the side surface of the tooth 212 and the outer radius R1 of the tooth 212 may be even, and thus the unnecessary injection-molding product may be generated slightly. In this case, since a height of the tooth 212 is greater than widths W1 and W2 of the tooth 212, the gap d may be formed on the upper part and the lower part of the tooth 212 to minimize forming of the unnecessary injection-molding product.

That is, when the gap d is formed on the upper part and the lower part of the tooth 212, since the forming of the unnecessary injection-molding product may be minimized and the structure of the mold 10 may be simplified, productivity may be improved.

Referring to FIG. 9, the gap d may be formed on not only the upper part and the lower part of the tooth 212 but also on the side surface 214 of the tooth 212.

Although the structure of the mold 10 may be complicated, generation of an unnecessary injection-molding product formed on the outer circumferential surface 213 may be fundamentally prevented.

Accordingly, when the gap d is formed on not only the upper part and the lower part of the tooth 212 but also on the side surface of the tooth 212, vibrations and noises of the motor 1 generated by the unnecessary injection-molding product may be prevented, and products corresponding to an external diameter size of the desired stator 200 may be provided.

Meanwhile, when the gap d is formed not only on the upper part and the lower part of the tooth 212 but also on the side surface of the tooth 212, the stator core 210 may be formed through the above-described stacking method. That is, the stator core 210 in which a skew is formed by a bonded stacking method may be formed, and the insulator 220 may be injection-molded in the stator core 210 in which the skew is formed to form the stator 200.

Referring to FIG. 2, the plurality of power terminals 400 disposed to apply power (not shown) to the coil 230 may be disposed on the insulator 220.

Referring to FIGS. 10 to 18, the power terminal 400 may include a body 410, a pin portion 420, a coupling portion 430, and a first protrusion 440. Further, the power terminal 400 may also include a second protrusion 450.

The body 410 may be formed to be curved toward to the outside to have a predetermined curvature radius R3.

Further, as shown in FIGS. 10, 12, and 14, the body 410 may be formed in an arc shape. In addition, the body 410 may be disposed on the insulator 220 along the circumferential direction with respect to the center C.

The pin portion 420 may be formed to protrude upward from the body 410 and may be integrally formed with the body 410. That is, the pin portion 420 may be formed to extend upward from one side of the body 410.

The pin portion 420 may include a power connection part 421 disposed to be spaced apart from the body 410 and a first connection part 422 disposed between the body 410 and the power connection part 421.

Further, the power connection part 421 and the first connection part 422 may be integrally formed, and an end of the power connection part 421 may be formed in a cylindrical shape. Here, although an example in which the power connection part 421 is formed in a cylindrical shape is described, the present invention is not limited thereto, and the power connection part 421 may be formed in a triangular prism shape, a quadrangular pillar shape, or a polygonal pillar shape in consideration of electrical connection with the power.

Meanwhile, the pin portion 420 may be disposed to be spaced apart toward the outside from an outer circumferential surface 411 of the body 410.

Here, the outside refers to an outside in the radial direction of the center C with respect to the body 410, and an inside refers to the inside in the radial direction of the center C with respect to the body 410.

Although an example in which the pin portion 420 of the embodiment is disposed to be spaced apart toward the outside from the body 410 is described, the present invention is not always limited thereto, and the pin portion 420 may also be disposed to be spaced apart toward the inside from the body 410. However, in a disposition relation between the pin portion 420 and the second protrusion 450, the pin portion 420 and the second protrusion 450 may be disposed to be oppositely spaced apart from each other with respect to the body 410 for structural stability.

The coupling portion 430 may be formed on one end of the body 410 to be coupled to an end of the coil 230. Further, the coupling portion 430 may be integrally formed with the body 410.

The coupling portion 430 may be formed in a structure which comes into contact with, and is coupled to, the end of the coil 230. For example, the coupling portion 430 may be formed to be bent in a shape which surrounds the end of the coil 230. That is, as shown in FIG. 2, the coupling portion 430 may have a cross-section formed in a U shape. In this case, the coupling portion 430 may be formed by inwardly bending the one end of body 410.

Meanwhile, the coupling portion 430 may be formed to have a predetermined height difference h from the body 410. Preferably, an upper surface 431 of the coupling portion 430 may be disposed to be higher than an upper surface 413 of the body 410. That is, as shown in FIGS. 12, 15, and 18, a height h1 of the coupling portion 430 may be disposed to be greater than a height h2 of the body 410 with respect to a lower surface 414 of the body 410.

Accordingly, when the coil 230 and the coupling portion 430 are fused, since a fusing area increases, the end of the coil 230 may be easily coupled to the coupling portion 430.

The first protrusion 440 and the second protrusion 450 may be formed to protrude downward from the body 410. Here, the first protrusion 440 and the second protrusion 450 may be integrally formed with the body 410.

Further, the first protrusion 440 and the second protrusion 450 may be insertion-coupled to an insertion port 222 formed in the insulator 220.

Particularly, the second protrusion 450 may be disposed to be spaced apart toward the inside or the outside from the body 410. For example, as shown in FIGS. 11 and 14, the second protrusion 450 may be disposed to be spaced apart toward the inside from an inner circumferential surface 412 of the body 410.

The second protrusion 450 may include a fitting part 451 disposed to be spaced apart from the body 410 and a second connection part 452 disposed between the body 410 and the fitting part 451.

Accordingly, since the second protrusion 450 is disposed to be spaced apart from the first protrusion 440 along a circumferential direction and is also disposed to be spaced apart from the body 410, vibrations and movement of the power terminal 400 in the circumferential direction or the radial direction are prevented. Accordingly, noise generation according to the vibrations of the power terminal 400 due to rotation of the motor 1 is prevented.

Further, when the power terminal 400 is insertion-installed in the insulator 220, since the first protrusion 440 and the second protrusion 450 are installed to be spaced apart from each other in the circumferential direction and the radial direction, assembly errors may be prevented.

Meanwhile, as shown in FIGS. 10 to 18, the power terminal 400 may be formed in a various shapes. Hereinafter, in a description of the power terminal 400, the power terminal 400 is classified into a first power terminal 400a, a second power terminal 400b, and a third power terminal 400c, which are embodiments thereof, to clarify a description of the various embodiments of the power terminal 400.

The power terminal 400 disposed on the insulator 220 may be numerously disposed due to at least of one or a combination of the first power terminal 400a, the second power terminal 400b, and the third power terminal 400c.

FIG. 10 is a perspective view illustrating the first power terminal 400a according to the embodiment. FIG. 11 is a plan view illustrating the first power terminal 400a according to the embodiment. Further, FIG. 12 is a side view in which the first power terminal 400a according to the embodiment is viewed from the radial direction.

As shown in FIGS. 10 and 11, the pin portion 420 of the first power terminal 400a may be disposed on one end of the body 410. Further, the coupling portion 430 may be disposed on the other end of the body 410. In this case, the coupling portion 430 may be formed by inwardly bending the one end of the body 410. Accordingly, the coupling portion 430 may be formed in a U shape from a top view.

As shown in FIG. 12, the height h1 of the coupling portion 430 may be disposed to be greater than the height h2 of the body 410 with respect to the lower surface 414 of the body 410.

Further, the pin portion 420 is disposed to be outwardly spaced apart from the outer circumferential surface 411 of the body 410 by a predetermined interval d1, and the second protrusion 450 is disposed to be inwardly spaced apart from the inner circumferential surface 412 of the body 410 at a predetermined interval d2.

FIG. 13 is a perspective view illustrating the second power terminal 400b according to another embodiment. FIG. 14 is a plan view illustrating the second power terminal 400b according to another embodiment. FIG. 15 is a side view in which the second power terminal 400b according to another embodiment is viewed from a radial direction.

As shown in FIGS. 13 and 14, a coupling portion 430 of the second power terminal 400b may be disposed on one end of a body 410. Further, a pin portion 420 may be disposed between the one end and the other end of the body 410. In addition, a second protrusion 450 may be disposed on the other end of the body 410.

In this case, the coupling portion 430 may be formed by inwardly bending the one end of the body 410. Accordingly, the coupling portion 430 may be formed in a U shape from a top view.

As shown in FIG. 15, a height h1 of the coupling portion 430 may be disposed to be greater than a height h2 of the body 410 with respect to a lower surface 414 of the body 410.

Further, the pin portion 420 is disposed to be outwardly spaced apart from an outer circumferential surface 411 of the body 410 at a predetermined interval d1, and the second protrusion 450 is disposed to be inwardly spaced apart from an inner circumferential surface 412 of the body 410 at a predetermined interval d2.

FIG. 16 is a perspective view illustrating the third power terminal 400c according to still another embodiment. FIG. 17 is a plan view illustrating the third power terminal 400c according to still another embodiment. FIG. 18 is a plan view and a side view illustrating the third power terminal 400c according to still another embodiment.

As shown in FIGS. 16 and 17, in the third power terminal 400c, two first protrusions 440 are spaced apart from each other in a circumferential direction to be disposed under a body 410. In this case, a pin portion 420 of the third power terminal 400c is disposed on one end of the body 410, and a coupling portion 430 is disposed on the other end of the body 410. Further, In this case, the coupling portion 430 may be formed by inwardly bending the one end of the body 410. Accordingly, the coupling portion 430 may be formed in a U shape from a top view.

As shown in FIG. 18, a height h1 of the coupling portion 430 may be disposed to be greater than a height h2 of the body 410 with respect to a lower surface 414 of the body 410.

That is, in comparison with the first power terminal 400a, in the third power terminal 400c, only the pin portion 420 is disposed to be outwardly spaced apart from an outer circumferential surface 411 of the body 410 at a predetermined interval d1.

Accordingly, in the motor 1, since at least one or a combination of the first power terminal 400a, the second power terminal 400b, and the third power terminal 400c is disposed on the insulator 220, the power terminal 400 may be disposed without limitation of a location, in which the end 231 of the coil 230 is exposed, to be coupled to the end of the coil 230.

Referring to FIG. 2, the housing 500 is disposed so that the power terminal 400 may be fixed to the stator 200.

The housing 500 may include a cylindrical-shaped housing main body 510 and a flange 520 formed to protrude outward from an end of the housing main body 510. Here, the housing main body 510 and the flange 520 may be integrally formed.

The housing main body 510 may be disposed at the outside of the stator 200 to surround an outer circumferential surface of the stator 200.

The flange 520 may be disposed on the stator 200 to press an upper part of the power terminal 400. In this case, the pin portion 420 of the power terminal 400 may be disposed to pass through the flange 520. Further, a through hole 521 may be formed in the flange 520 to allow the pin portion 420 to pass therethrough and be coupled thereto.

In addition, coupling of the pin portion 420 and the through hole 521 limits an assembly location of the housing 500 when the housing 500 is assembled.

In addition, since the through hole 521 of the housing 500 is coupled to the pin portion 420 to allow the pin portion 420 to pass therethrough, the vibrations and movement of the power terminal 400 in a circumferential direction, a radial direction, and an axial direction are prevented. Accordingly, the housing 500 prevents the noise generation by preventing the vibrations of the power terminal 400 due to the rotation of the motor 1.

The pin portion 420, the first protrusion 440, and the second protrusion 450 of the power terminal 400 may be integrally formed with the body 410, and thus may be manufactured in one mold. Accordingly, a structure of the power terminal 400 may be simplified, and thus manufacturing and an assembly process of the power terminal 400 may be simplified.

Further, the power terminal 400 may satisfy true position geometric tolerance and improve size precision to increase the yield.

As shown in FIGS. 10 to 18, the pin portion 420, the first protrusion 440, and the second protrusion 450 of the power terminal 400 may implement a three-dimensional three point support structure which is coupled to the insulator 220 and the housing 500 to prevent the generation of the vibrations and noises according to the rotation of the motor 1 and secure the structural stability.

Although the above-described descriptions are described with reference to the embodiments of the present invention, it should be understood that those skilled in the art may be capable of variously modifying and changing within the spirit and the scope of the present invention disclosed in the claims which will be described below. Further, differences related to modifications and changes should be understood to be included in the scope of the present invention defined in the appended claims.

REFERENCE NUMERALS

1: motor, 100: rotor, 110: rotor core, 120: magnet, 200: stator, 210: stator core, 211: main body, 212: tooth, 220: insulator, 230: coil, 300: shaft, 400: power terminal, 410: body, 420: pin portion, 430: coupling portion, 440: first protrusion, 450: second protrusion, 500: housing

The invention claimed is:

1. A motor comprising:
a rotor;
a stator disposed at an outside of the rotor;
a shaft disposed at an inside of the rotor; and
a terminal disposed on the stator,
wherein the terminal includes:
   a body;
   a pin portion configured to extend upward from the body;
   a coupling portion formed at one side of the body and coupled to a coil;
   a first protrusion configured to protrude downward from the body; and
   a second protrusion configured to protrude downward from the body,
wherein the second protrusion has a first portion that extends from an inside or an outside of the body and a second portion that extends downward such that the second portion is spaced apart from the body,
wherein the body has an arc shape having a first end and a second end, and
wherein the one side of the body at which the coupling portion is formed is one of the first end or the second end.

2. The motor of claim 1, wherein:
the first protrusion and the second protrusion are coupled to an insertion port formed in an upper part of an insulator of the stator; and
the second protrusion is disposed to be spaced apart toward the inside from the body.

3. The motor of claim 1, wherein the stator includes:
a skew-type stator core having a cylindrical-shaped main body and including a plurality of teeth formed along a circumferential direction of the main body to protrude from the main body in a radial direction;
an insulator disposed in the stator core; and
a coil wound around the insulator,
wherein the first protrusion and the second protrusion are insertion-coupled to an insertion port formed in the insulator.

4. The motor of claim 1, wherein the pin portion is provided at another of the first end or the second end.

5. The motor of claim 1, wherein the pin portion is provided between the first end and the second end.

6. The motor of claim 1, wherein the inside of the body is an inner circumferential side and the outside of the body is an outer circumferential side of the body.

7. The motor of claim 1, wherein the body, the pin portion, the coupling portion, the first protrusion, and the second protrusion are integrally formed.

8. The motor of claim 1, wherein the body is formed in a curved shape to have a predetermined curvature radius.

9. The motor of claim 8, wherein the pin portion is disposed to be spaced apart toward the outside from the body.

10. The motor of claim 9, wherein the second protrusion is disposed opposite the pin portion with respect to the body.

11. The motor of claim 9, wherein the pin portion includes:
a power connection part disposed to be spaced apart from the body; and
a first connection part disposed between the body and the power connection part.

12. The motor of claim 11, wherein an end of the power connection part is formed in a cylindrical shape.

13. A motor comprising:
a rotor;
a stator disposed at an outside of the rotor;
a shaft disposed at an inside of the rotor;
a terminal disposed on the stator, the terminal including:
   a body;
   a pin portion configured to extend upward from the body;
   a coupling portion formed at one side of the body and coupled to a coil;
   a first protrusion configured to protrude downward from the body; and
   a second protrusion configured to protrude downward from the body, the second protrusion being disposed to be spaced apart toward an inside or an outside from the body;
a skew-type stator core having a cylindrical-shaped main body and including a plurality of teeth formed along a circumferential direction of the main body to protrude from the main body in a radial direction;
an insulator disposed in the stator core;
a coil wound around the insulator; and
a housing including:
   a cylindrical-shaped housing main body; and
   a flange formed to protrude outward from an end of the housing main body,
wherein the pin portion passes through and is coupled to a through hole formed in the flange, and
wherein the first protrusion and the second protrusion are insertion-coupled to an insertion port formed in the insulator.

14. A motor comprising:
a rotor;
a stator disposed at an outside of the rotor;
a shaft disposed at an inside of the rotor;
a terminal disposed on the stator, the terminal including:
   a body;
   a pin portion configured to extend upward from the body;
   a coupling portion formed at one side of the body and coupled to a coil;
   a first protrusion configured to protrude downward from the body; and a second protrusion configured to protrude downward from the body, the second protrusion being disposed to be spaced apart toward an inside or an outside from the body;

a skew-type stator core having a cylindrical-shaped main body and including a plurality of teeth formed along a circumferential direction of the main body to protrude from the main body in a radial direction;

an insulator disposed in the stator core; and a coil wound around the insulator, wherein the insulator is disposed in the tooth by an insert injection-molding method, and wherein an external diameter of the insulator is formed to be smaller than an external diameter of the tooth and thus a gap is formed between the tooth and the insulator.

15. The motor of claim 14, wherein the tooth includes a plurality of first teeth and a plurality of second teeth disposed between the first teeth, and wherein a width of the first tooth is greater than a width of the second tooth.

16. The motor of claim 15, wherein the first tooth is formed in a T shape, and wherein the second tooth is formed in an l shape.

17. A motor comprising:

a rotor;

a stator disposed at an outside of the rotor;

a shaft disposed at an inside of the rotor; and a terminal disposed on the stator, wherein the terminal includes:

a body;

a pin portion configured to extend upward from the body;

a coupling portion formed at one side of the body and coupled to a coil;

a first protrusion configured to protrude downward from the body; and a second protrusion configured to protrude downward from the body, wherein the second protrusion has a first portion that extends from an inside or an outside of the body and a second portion that extends downward such that the second portion is spaced apart from the body, and wherein a height of the coupling portion is disposed to be greater than a height of the body with respect to a lower surface of the body.

* * * * *